(12) United States Patent
Yonezawa et al.

(10) Patent No.: US 7,303,186 B2
(45) Date of Patent: Dec. 4, 2007

(54) ALIGNING DRIVE MECHANISM AND POSITIONING APPARATUS HAVING THIS MECHANISM

(75) Inventors: Keitaro Yonezawa, Kobe (JP); Tsutomu Shirakawa, Kobe (JP); Yosuke Haruna, Kobe (JP)

(73) Assignee: Kosmek, Ltd., Kobe-shi Hyogo (JP)

( * ) Notice: Subject to any disclaimer, the term of this patent is extended or adjusted under 35 U.S.C. 154(b) by 114 days.

(21) Appl. No.: 10/541,239

(22) PCT Filed: Dec. 17, 2003

(86) PCT No.: PCT/JP03/16141

§ 371 (c)(1),
(2), (4) Date: Jul. 1, 2005

(87) PCT Pub. No.: WO2004/060607

PCT Pub. Date: Jul. 22, 2004

(65) Prior Publication Data

US 2006/0049568 A1    Mar. 9, 2006

(30) Foreign Application Priority Data

Jan. 7, 2003    (JP)    ............................ 2003-000772

(51) Int. Cl.
*B23Q 3/00*    (2006.01)

(52) U.S. Cl. ...................................... 269/309; 269/310

(58) Field of Classification Search ........ 269/309–310, 269/32; 279/4.12, 4.06
See application file for complete search history.

(56) References Cited

U.S. PATENT DOCUMENTS

| | | | |
|---|---|---|---|
| 5,820,118 A | 10/1998 | Craft | |
| 6,024,354 A * | 2/2000 | Yonezawa | 269/309 |
| 6,095,509 A * | 8/2000 | Yonezawa | 269/309 |
| 6,604,738 B2 * | 8/2003 | Haruna | 269/309 |
| 2004/0046302 A1* | 3/2004 | Bernhard et al. | 269/309 |
| 2006/0049568 A1* | 3/2006 | Yonezawa et al. | 269/309 |
| 2006/0055099 A1* | 3/2006 | Haruna | 269/309 |

FOREIGN PATENT DOCUMENTS

| | | |
|---|---|---|
| EP | 925871 | 6/1999 |
| EP | 1 078 713 | 2/2001 |
| JP | 2001-225236 | 8/2001 |

OTHER PUBLICATIONS

Microfilm of the specification and drawings annexed to the request of Japanese Utility Model Application No. 106147/1972 (Laid-Open No. 60153/1974), (Fuji Kikai Kogyo Kabushiki Kaisha), May 27, 1974, Full text; Figs. 1 to 3.

* cited by examiner

*Primary Examiner*—Lee D. Wilson
(74) *Attorney, Agent, or Firm*—Bacon & Thomas PLLC

(57) ABSTRACT

A housing (6) is provided in a reference block (1). An annular plug (9), which is to be inserted into a positioning hole (3) of a work pallet (2), is projected upward from the housing (6). An output member (13) is inserted into a guide hole (10) of the housing (6) vertically movably. An upper end of the output member (13) is inserted into the annular plug (9), and a plurality of pressing members (56) are supported on a peripheral wall (9a) of the annular plug (9) radially movably. An annular aligning space (31) is formed between a guided portion (21) of the output member (13) and the guide hole (10). A shuttle member (41), which is diametrically expandable and contractible, is inserted into the aligning space (31). The shuttle member (41) is urged upward by a spring (51).

22 Claims, 10 Drawing Sheets

ALIGNING DRIVE MECHANISM AND POSITIONING APPARATUS HAVING THIS MECHANISM

TECHNICAL FIELD

The present invention relates to a mechanism which drives an output member such as a clamp rod and the like while aligning, and a positioning apparatus having this mechanism, more specifically, to a technique preferable for positioning a clamp for fixing a work piece or a metal mold or the like, or for positioning a work pallet or the like.

BACKGROUND OF THE INVENTION

This kind of driving mechanism is described in U.S. Pat. No. 5,820,118 for example. This driving mechanism in the prior art is composed as follows.

A clamp rod is inserted into a housing, a middle high portion of the clamp rod is supported vertically movably on an upper wall of the housing, and a piston provided at a lower portion of the clamp rod is supported on a barrel portion of the housing vertically movably.

The above-mentioned prior art contains several problems.

That is, to move the piston smoothly, a relatively large fitting gap is required between an outer peripheral surface of the piston and an inner peripheral surface of the barrel portion of the housing. Therefore, the clamp rod tilts due to the fitting gap during clamping operation of the clamp rod. As a result, the clamp rod cannot be accurately guided.

In order to solve this problem, the present inventors considered the following structure prior to the present invention. That is, the clamp rod is provided with two upper and lower sliding portions axially at intervals, these sliding portions are accurately fitted into an upper end wall and a lower end wall of the housing respectively, and the piston is fixed to an intermediate portion between the two sliding portions of the clamp rod.

This example of the preceding invention is excellent in that the clamp rod is strongly supported on the housing at the upper and lower points, which enables the clamp rod to be guided accurately. However, any sliding gap cannot be omitted between each of the sliding portions and the housing, which contains a problem that the sliding gap could increase due to machining errors. Therefore, there has been room for improvement in guiding the clamp rod with higher accuracy.

It is a first object of the present invention to provide a new aligning drive mechanism that can guide an output member such as a clamp rod and the like with high accuracy.

And it is a second object of the present invention to put a positioning apparatus having the above-mentioned mechanism to practical use.

SUMMARY OF THE INVENTION

In order to accomplish the first object mentioned above, the present invention provides an aligning drive mechanism, for example, as described below and illustrated in FIG. 1A and FIG. 1B, FIG. 4A and FIG. 4B, FIG. 5 and FIG. 6, or FIG. 11, respectively.

A guide hole 10 as a reference surface for aligning is formed in a housing 6, an output member 13 is inserted into the guide hole 10 axially movably. The output member 13 is provided with a plurality of guided portions (21, 22) axially at intervals. An annular aligning space (31, 32), which narrows in either one axial direction, is formed between at least one of the guided portions (21, 22) and the guide hole 10. A shuttle member (41,42), which is diametrically expandable and contractible, is inserted into the aligning space (31, 32). The shuttle member (41, 42) is supported on either one of the guide hole 10 or the guided portion (21, 22) axially movably, and adapted to make a tapering engagement with the other (21, 22 or 10). The shuttle member (41, 42) is urged by an urging means (51, 52) in such a direction as to tighten the tapering engagement. The output member 13 is adapted to be axially reciprocatable by a driving means D.

Besides, it is sufficient that at least one pair of the annular aligning space (31, 32) and the shuttle member (41, 42) be provided, however, preferably, a plurality of pairs thereof may be provided in order to move the output member 13 smoothly with high accuracy.

This invention provides the following function and effects.

When the output member axially moves by the driving means, the shuttle member, which is expanded by the tapering engagement with the guided portion (or the guide hole), is brought into close contact with the guide hole (or the guided portion), by which the fitting gap in the prior art or the sliding gap in the example of the preceding invention can be automatically eliminated. The output member moves straight while being constrained by the guide hole via the shuttle member, which is in a stuck state. As a result, the output member can be guided with high accuracy along the axis of the guide hole as a reference surface for aligning.

It is preferable that the following structure is added to the present invention.

For example, as illustrated in FIG. 1A, the guide hole 10 is composed of a first guide hole 11 and a second guide hole 12, the diameter of which is larger than that of the first guide hole 11. A plurality of the guided portions are composed of a first guided portion 21 corresponding to the first guide hole 11 and a second guided portion 22 corresponding to the second guide hole 12. The annular aligning space 31 is formed between the first guide hole 11 and the first guided portion 21. The shuttle member 41 is inserted into the aligning space 31.

According to this invention, the output member is guided with high accuracy by the first guide hole via the shuttle member. And the output member is guided smoothly by the large-diameter second guide hole.

The present invention includes the following structure in addition to the above-described structure. That is, the annular aligning space 32 is formed between the second guide hole 12 and the second guided portion 22, and the shuttle member 42 is inserted into the aligning space 32.

According to this invention, since the shuttle member is also attached to the large-diameter second guide hole, the output member can be guided with higher accuracy by the second guide hole.

In addition, it is preferable that the present invention includes the following structure.

That is, a straight surface (45, 46) of the shuttle member (41, 42) is movably supported on the guide hole 10, and a tapered surface (47, 48) of the shuttle member (41, 42) is adapted to make a tapering engagement with the guided portion (21, 22).

According to this invention, since the guide hole as the reference surface for aligning are straight, hole boring can be performed with high accuracy and easily.

In the present invention, the straight surface (45, 46) of the shuttle member (41, 42) may be movably supported on the guided portion (21, 22), and the tapered surface (47, 48)

of the shuttle member (41, 42) may be adapted to make a tapering engagement with the guide hole 10 instead.

In the present invention, the output member can be moved with load toward either a base end or a leading end thereof.

In a case that the annular aligning space is formed in such a manner as the tapering engagement to be tightened during the with-load movement of the output member in each direction mentioned above, a sticking force of the shuttle member increases, by which the output member can be guided with higher accuracy.

On the other hand, in a case that the annular aligning space is formed in such a manner as the tapering engagement to be loosened during the with-load movement of the output member in each direction, the sticking force of the shuttle member decreases, by which sliding resistance of the shuttle member decreases, and the output member can be smoothly guided.

In order to accomplish the above-mentioned second object, the positioning apparatus in the present invention comprises the aligning drive mechanism wherein the output member moves with load toward the base end, and is composed, for example, as described below and as illustrated in FIG. 1A and FIG. 1B, FIG. 4A and FIG. 4B, and FIG. 5 and FIG. 6, respectively.

A reference block 1 as a fixed side is provided with the housing 6. An annular plug 9, which is to be inserted into a positioning hole 3 of a movable block 2, is projected from the housing 6 toward a leading end. An output portion 16 of the output member 13 is inserted into the annular plug 9, a wedge surface 55 is provided on a periphery of the output portion 16 in such a manner that the wedge surface 55 gets closer to the axis toward the base end. A plurality of pressing members 56 are supported on a peripheral wall 9a of the annular plug 9 circumferentially at intervals and radially movably. The wedge surface 55 is adapted to make a wedge engagement with the pressing members 56. The pressing members 56 are adapted to be restorable radially inward by a returning means 58.

This invention of the positioning apparatus provides the following function and effects.

During locking operation, the output member moves straight toward the base end along the axis of the guide hole provided in the reference block as described above. Therefore, the output portion of the output member can position the movable block with high accuracy via a plurality of the pressing members.

In this positioning apparatus, it is preferable that, for example, as illustrated in FIG. 1A, the annular plug 9 having a ceiling wall 9b is fixed to the housing 6.

In this case, foreign matter in the atmosphere can be prevented from entering the wedge surface or the aligning space by the ceiling wall.

In this positioning apparatus, as illustrated in FIG. 4A or FIG. 5 for example, the annular plug 9 having the ceiling wall 9b may be supported on the housing 6 axially movably within a predetermined range, and the annular plug 9 may be pressed toward the leading end by a advancing means 72.

In this case, foreign matter in the atmosphere can also be prevented from entering the wedge surface or the aligning space by the ceiling wall.

Furthermore, during locking operation of the output member, the annular plug moves toward the base end against the advancing means, by which the movable member can be pulled toward the base end by the pressing members. Therefore, the movable member can be strongly pressed against the reference member.

In order to accomplish the second object, another positioning apparatus comprises the aligning drive mechanism wherein the output member moves with load toward the base end, and is composed, for example, as described below and as illustrated in FIG. 11.

A reference block 1 as a fixed side is provided with the housing 6. An annular collet 90, which is to be inserted into a positioning hole 3 of a movable block 2, is supported on the housing 6 axially movably within a predetermined range. The annular collet 90 is pressed toward a leading end by the advancing means 72. An output portion 16 of the output member 13 is inserted into the annular collet 90, a wedge surface 55 is provided on a periphery of the output portion 16 in such a manner that the wedge surface 55 gets closer to the axis toward the base end. A pressing portion 92, which engages with the positioning hole 3, is provided on a peripheral surface of the annular collet 90.

This positioning apparatus provides the following function and effects.

During locking operation, the output member moves straight toward the base end along the axis of the guide hole provided in the reference block as described above. Therefore, the output portion of the output member can position the movable block with high accuracy via the pressing portion of the annular collet.

Furthermore, during locking operation of the output member, the annular collet moves toward the base end against the advancing means, by which the movable member can be pulled toward the base end by the pressing portion. Therefore, the movable member can be strongly pressed against the reference member.

It is preferable that this positioning apparatus is composed as follows.

For example, as shown in FIG. 11 or FIG. 14C, the annular collet 90 is integrally formed with at least one slit 91, and adapted to be contractible by either one of its own elastic restoring force or a returning means 94. In this case, the annular collet can be mechanically simple.

For example, as shown in FIG. 14D or FIG. 14E, the annular collet 90 is composed of a plurality of divided members 96 arranged circumferentially, and adapted to be contractible by a returning means 94. In this case, the annular collet can be manufactured with high accuracy.

In the above-mentioned positioning apparatus or the other positioning apparatus, as illustrated in FIG. 1A and FIG. 1B for example, the wedge surface 55 is formed with a tapered outer peripheral surface.

In addition, a plurality of the wedge surfaces 55 may be arranged circumferentially at intervals as illustrated in FIG. 4A and FIG. 4B, or FIG. 5 and FIG. 6. In this case, the pressing members can be expanded with high accuracy by the wedge surfaces.

Furthermore, it is preferable that a plurality of inclined grooves 75 are provided on the output portion 16 of the output member 13 circumferentially at intervals, and the wedge surface 55 is formed on a bottom wall 75a of the inclined groove 75.

Also, It is preferable that the returning means 58 is formed with a fitting structure between a peripheral wall of the inclined groove 75 and the pressing member 56. In this case, simplification of the structure of the returning means can be consistent with reliability of the returning action.

In the positioning apparatus, it is preferable that a supply port 62 for a cleaning fluid is provided in the housing 6, a discharge port 64 for the cleaning fluid is formed with a fitting gap between the peripheral wall 9a of the annular plug 9 and the pressing member 56, and the discharge port 64 is adapted to communicate with the supply port 62.

In this case, the fitting gap can be automatically cleaned up, by which the pressing member can be expandable and contractible with high accuracy and smoothly.

In addition, in the other positioning apparatus, it is preferable that a supply port 62 for a cleaning fluid is provided in the housing 6, a discharge port 64 for the cleaning fluid is formed in the peripheral wall of the annular collet 90, and the discharge port 64 is adapted to communicate with the supply port 62.

In this case, the gap for both expansion and contraction of the annular collet can be automatically cleaned up, by which the annular collet can be expandable and contractible with high accuracy and smoothly.

BEST MODE FOR CARRYING OUT THE INVENTION

Figure 1B:
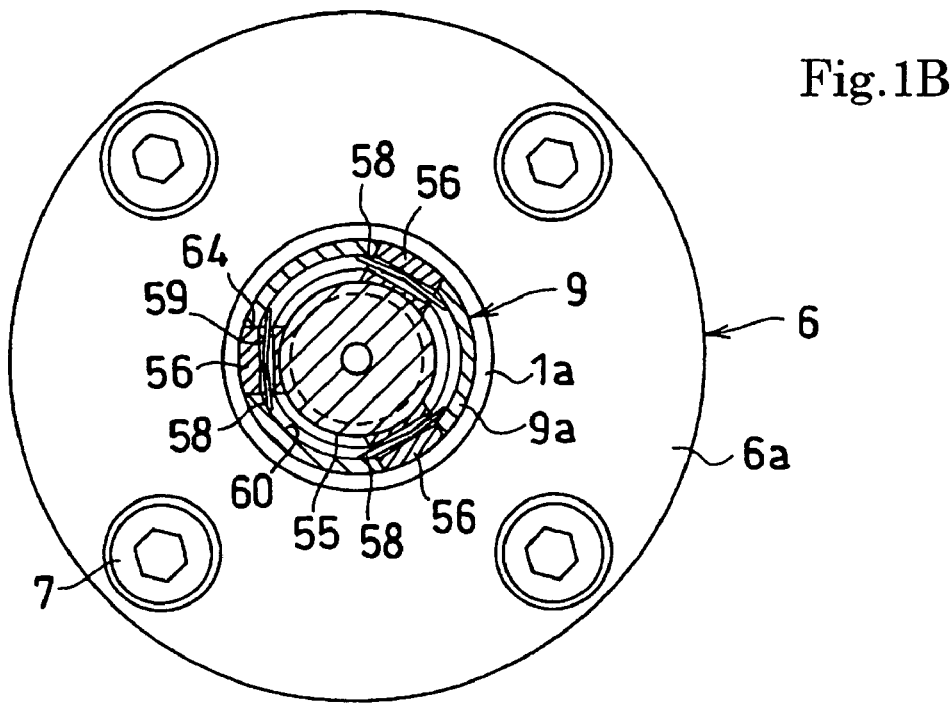
FIG. 1B is a cross-sectional view indicated by the arrow 1B-1B in FIG. 1A.
Figure 1A:
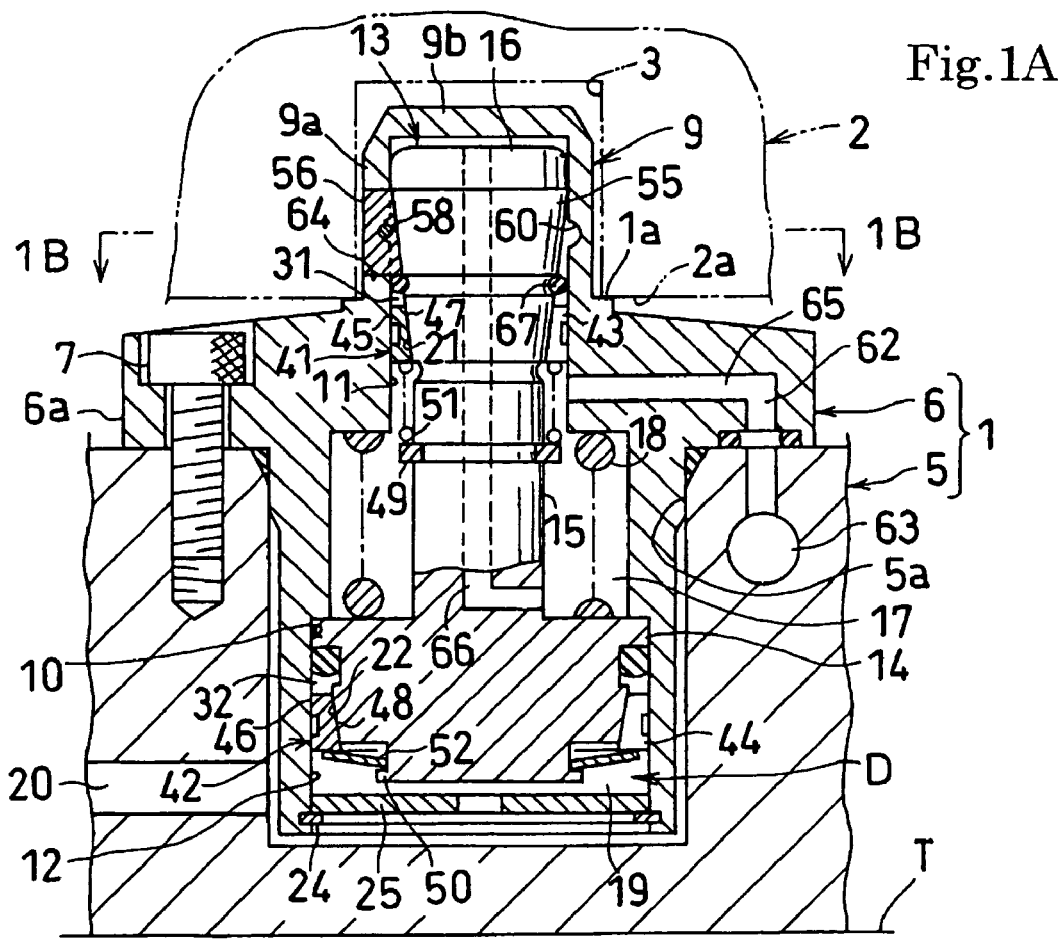
FIG. 1A is an elevational cross-sectional view of a positioning apparatus having an aligning drive mechanism in a released state, showing a first embodiment according to the present invention.

FIG. 1A and FIG. 1B show a first embodiment of the present invention, and illustrate a positioning apparatus having an aligning drive mechanism applied to a pallet system. FIG. 1A is an elevational cross-sectional view showing the positioning apparatus in a released state. FIG. 1B is a cross-sectional view indicated by the arrow 1B-1B in FIG. 1A.

In this embodiment, on a table T of a machine tool is placed a reference block 1, a support surface 1a is adapted to receive a supported surface 2a of a work pallet 2 as a movable block. In the supported surface 2a are opened a plurality of positioning holes 3 formed with circular straight holes. Herein, only one of the positioning holes 3 is illustrated.

The reference block 1 comprises a base plate 5 fixed to the table T and a housing 6 fixed to the base plate 5. Into an installation hole 5a opened in the base plate 5 is accurately fitted the housing 6, and a flange 6a of the housing 6 is fixed to a peripheral wall of the installation hole 5a with a plurality of tightening bolts 7.

From the housing 6 is projected an annular plug 9 upward (toward a leading end), this annular plug 9 is adapted to be inserted into the positioning hole 3. Herein, the annular plug 9 is formed integrally with the housing 6, by which the axis of the annular plug 9 is precisely aligned to that of the installation hole 5a. On an outer periphery of a lower portion of the annular plug 9 is formed the support surface 1a.

The housing 6 is provided with the aligning drive mechanism.

That is, inside the housing 6 is vertically formed a guide hole 10 as a reference surface for aligning. The guide hole 10 comprises a small-diameter first guide hole 11 provided at an upper portion of the housing 6 and a large-diameter second guide hole 12 provided at a lower portion of the housing 6.

Into the guide hole 10 is axially movably inserted an output member 13, which extends vertically. The output member 13 comprises a piston 14 hermetically inserted into the second guide hole 12, a piston rod 15 projected upward from the piston 14 and an output portion 16 provided at an upper end of the piston rod 15. In a lock chamber 17 formed above the piston 14 is installed a lock spring 18 composed of a compressed coil spring. Also, with a release chamber 19 formed below the piston 14 communicates a supply and discharge port 20 for pressurized oil. That is, a driving means D, which makes the output member 13 reciprocate vertically, is composed of the piston 14 and the lock spring 18 and the release chamber 19.

A retaining ring 24 fitted to a lower part of the second guide hole 12 supports an end plate 25.

On an outer peripheral surface of the output member 13 are provided a first guided portion 21, which corresponds to the first guide hole 11 and a second guided portion 22, which corresponds to the second guide hole 12. The first guided portion 21 is provided on the piston rod 15, and the second guided portion 22 is provided on the piston 14.

Between the first guided portion 21 and the first guide hole 11 is formed an annular first aligning space 31, which narrows upward. Into the first aligning space 31 is inserted a first shuttle member 41. In the same way, between the second guided portion 22 and the second guide hole 12 is formed an annular second aligning space 32, which narrows upward. Into the second aligning space 32 is inserted a second shuttle member 42.

The first shuttle member 41 is formed with an annular bearing member, which is made of special alloy steel hardened or copper alloy or the like, and is diametrically expandable and contractible by providing a slit 43 in an annular wall thereof. On an outer periphery of the annular first shuttle member 41 is formed a straight surface 45 while on an inner periphery thereof is formed a tapered surface 47, which narrows downward. The straight surface 45 is supported on the first guide hole 11 vertically slidably, and the tapered surface 47 is adapted to make a tapering engagement with the first guided portion 21. A first urging means 51, which tightens the tapering engagement, is composed of a compressed coil spring here, and is installed between a spring seat 49 attached to the piston rod 15 and the first shuttle member 41, and urges the first shuttle member 41 upward.

The second shuttle member 42 is also diametrically expandable and contractible by providing a slit 44 in an annular wall thereof. On an outer periphery of the second shuttle member 42 is formed a straight surface 46 while on an inner periphery thereof is formed a tapered surface 48, which narrows downward. The straight surface 46 is supported on the second guide hole 12 vertically slidably, and the tapered surface 48 is adapted to make a tapering engagement with the second guided portion 22. A second urging means 52, which tightens the tapering engagement, is composed of a coned disk spring here, and is installed between a spring seat 50 provided on the piston 14 and the second shuttle member 42, and urges the second shuttle member 42 upward.

The output portion 16 of the output member 13 comprises a wedge surface 55, which is composed of a tapered outer peripheral surface, which narrows downward (toward a base end).

The annular plug 9 is formed into a cap shape, comprising a peripheral wall 9a and a ceiling wall 9b. On the peripheral wall 9a are supported three pressing members 56 circumferentially at intervals radially movably. The pressing members 56 make wedge engagement with the wedge surface 55. Here, An inner surface of the pressing member 56 is formed into an arc shape in a plan view, the radius of the arc thereof is set to a value larger than that of the tapered wedge surface 55. However, the inner surface of the pressing member 56 may be a flat surface instead of the arc surface.

The pressing members 56 are urged radially inward by rod-shaped returning springs (returning means) 58. The returning spring 58 is inserted into a through hole 59 opened in the pressing member 56, and both ends of the returning spring 58 are received by a U-shaped groove 60 formed in an inner periphery of the peripheral wall 9a.

On the flange 6a of the housing 6 is provided a supply port 62 for a cleaning compressed air, and the supply port 62 is adapted to communicate with a compressed air passage 63 of the base plate 5. A discharge port 64 for the cleaning compressed air is provided by a fitting gap between the peripheral wall 9a of the annular plug 9 and the pressing member 56. And, the supply port 62 is adapted to communicate with the discharge port 64 via a transverse passage 65 inside the flange 6a, the lock chamber 17, the vertical passage 66 inside the piston rod 15, a lower space of the ceiling wall 9b and a fitting gap on an outer periphery of the output portion 16, in the recited order.

It is noted that to the output member 13 is attached an O-ring sealing member 67 above the first guided portion 21. The sealing member 67 prevents foreign matter such as cutting oil and the like scattering in the atmosphere from entering the first aligning space 31 through the discharge port 64.

The positioning apparatus composed as described above operates as follows.

In a released state illustrated in FIG. 1A and FIG. 1B, pressurized oil has been supplied to the release chamber 19. Thereby, the piston 14 has been raising the output portion 16 against the urging force of the lock spring 18, and the pressing members 56 have returned radially inward by the returning springs 58. In addition, the first and second shuttle members 41 and 42 have been in slight contact with the first and second guide holes 11 and 12 by the first and second urging means 51 and 52 respectively.

When positioning the work pallet 2 on the reference block 1, first, as illustrated in FIG. 1A, the work pallet 2 is lowered with the positioning apparatus being in the released state to fit the annular plug 9 into the positioning hole 3, then the support surface 1a receives the supported surface 2a.

Next, the pressurized oil in the release chamber 19 is discharged. Then, the urging force of the lock spring 18 strongly lowers the output portion 16 via the piston 14 and the piston rod 15, by which the wedge surface 55 of the output portion 16 strongly pushes the three pressing members 56 radially outward.

Thereby, the positioning hole 3 is constrained horizontally by the guide hole 10 of the housing 6 via the pressing members 56, the output member 13 composed of the piston 14 and the piston rod 15, and the shuttle members 41 and 42, which are switched into a strong and close contact as described later, in the recited order. Thereafter, the supported surface 2a of the work pallet 2 is pressed against the support surface 1a of the housing 6 by a clamp means (not shown).

When releasing the above-described locked state, it is required only to supply the pressurized oil to the release chamber 19. Thereby, the piston 14 raises the output portion 16, by which the pressing members 56 return radially inward by the returning springs 58. Thereafter, the clamp means (not shown) is switched into an unclamped state, by which the work pallet 2 becomes removable upward.

While the output member 13 descends for locking (moves with load), by means of functions of the shuttle members 41 and 42, the output member 13 descends straight along the axis of the guide hole 10 (and the axis of the installation hole 5a of the base plate 5). This is described in detail as follows.

As the piston rod 15 descends, the first guided portion 21 engages with the tapered surface 47 of the first shuttle member 41, by which the first shuttle member 41 diametrically expands and the straight surface 45 is strongly brought into close contact with the first guide hole 11. Therefore, the piston rod 15 descends while being constrained by the first guide hole 11 via the first shuttle member 41, which is in the strong and close contact state.

In addition, While the piston 14 is descending, the second guided portion 22 engages with the tapered surface 48 of the second shuttle member 42, by which the second shuttle member 42 diametrically expands and the straight surface 46 is strongly brought into close contact with the second guide hole 12. Therefore, the piston 14 descends while being constrained by the second guide hole 12 via the second shuttle member 42, which is in the strong and close contact state.

Consequently, the output member 13 descends straight along the axis of the guide hole 10, by which the output portion 16 can position the work pallet 2 via a plurality of the pressing members 56 with high accuracy.

In addition, since the piston 14 can be guided straight by the second shuttle member 42, unbalanced wearing out of an outer peripheral surface of the piston 14 and a sealing member attached to this outer peripheral surface can be prevented. Consequently, life of the driving means D increases, and the positioning apparatus can be used for a long time without any maintenance.

It is noted that while the output member 13 ascends for releasing (moves with little or no load), by means of functions of the shuttle members 41 and 42, the output member 13 ascends straight along the axis of the guide hole 10. That is, the urging means 51 and 52 keep the shuttle members 41 and 42 in a slightly diametrically expanded state, accordingly the straight surfaces 45 and 46 are kept in slight contact with the guide holes 11 and 12. Consequently, the output member 13 ascends while being constrained by the guide holes 11 and 12 via the shuttle members 41 and 42 respectively.

To make the close contact and a vertical slidability of the shuttle members 41 and 42 consistent with each other, it is preferable that angles of obliquity of the tapered surface 47 and 48 are in a range of approximately 5 to 15 degrees, and more preferably, in a range of approximately 8 to 12 degrees. It is noted that these ranges of the angles are approximately 10 to 30 degrees and approximately 16 to 24 degrees in terms of tapered angle respectively.

Figure 2:
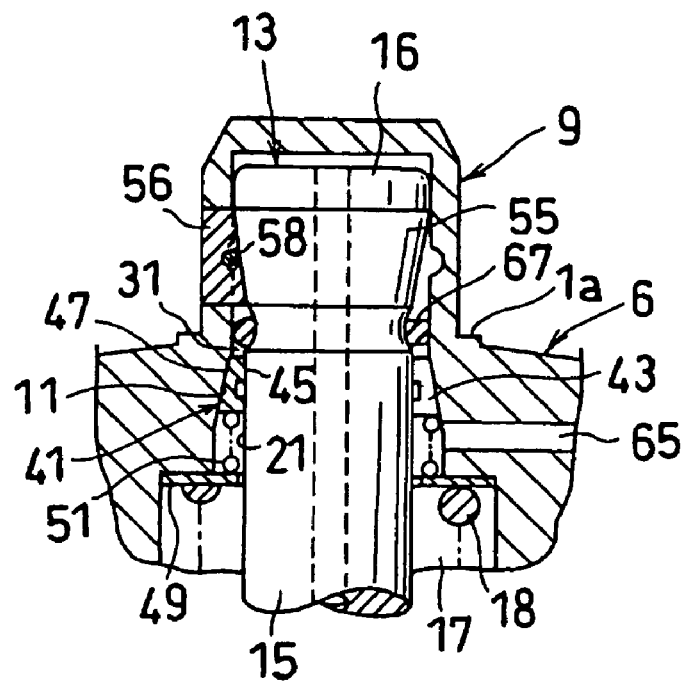
FIG. 2 is a partial view similar to FIG. 1A, showing a first exemplary variation of the first embodiment.
Figure 3:
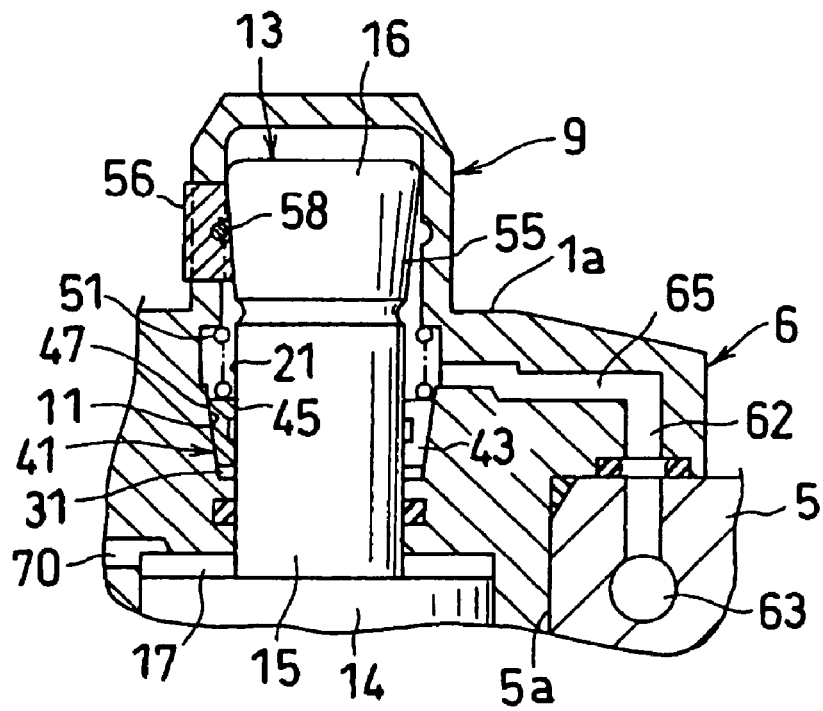
FIG. 3 is a partial view similar to FIG. 1A, showing a second exemplary variation of the first embodiment.

FIG. 2 and FIG. 3 are a partial view similar to FIG. 1A, showing exemplary variations of the first embodiment. In these exemplary variations, components similar to those of the first embodiment will be designated and described by the same numerals as a general rule.

The first exemplary variation illustrated in FIG. 2 is different from the structure illustrated in FIG. 1A in the following points.

On an inner periphery of the first shuttle member 41 inserted into the first aligning space 31, which narrows upward, is formed the straight surface 45, and on an outer periphery of the first shuttle member 41 is formed the tapered surface 47. The straight surface 45 is slidably supported on the first guided portion 21, and the tapered surface 47 makes a tapering engagement with the first guide hole 11.

According to this arrangement, sliding resistance, which occurs during locking operation (descending) of the output member 13 between the straight surface 45 of the first shuttle member 41 and the first guided portion 21, decreases.

It is noted that the spring seat 49, which supports the lower end of the first urging means 51, is pressed against and fixed to the housing 6 by the lock spring 18.

The second exemplary variation in FIG. 3 is different from the structure illustrated in FIG. 1A in the following points.

The first aligning space 31 is formed in such a manner as to narrow downward. Also, the straight surface 45 on the inner periphery of the first shuttle member 41 inserted into the first aligning space 31 is slidably supported on the first guided portion 21, and the tapered surface 47 on the outer periphery of the first shuttle member 41 makes a tapering engagement with the first guide hall 11. And, the upper end of the first urging means 51 is received by a lower part of the annular plug 9.

Furthermore, another supply and discharge port 70 communicates with the lock chamber 17 formed above the piston 14, by which the output member 13 is adapted to be movable downward for locking by hydraulic pressure.

The first embodiment and these exemplary variations can be changed as follows.

That is, the shuttle members 41 (or 42) may be provided with a plurality of through grooves opened in the annular wall thereof in such a manner that the grooves are opened alternately in an upper end and a lower end instead of being provided with above-mentioned one slit 43 (or 44) opened in this annular wall.

The shuttle member 41 (or 42) may be adapted to make the tapering engagement with the guided portion 21 (or 22) indirectly via an intermediate member (not shown). And/or, the shuttle member 41 (or 42) may be supported on the guide hole 11 (or 12) indirectly via another intermediate member (not shown).

The second aligning space 32, the second shuttle member 42, and the second urging means 52 in FIG. 1A may be omitted. In this case, it is sufficient that the second guided portion 22 is formed in a straight manner, and accurately fitted to the second guide hole 12.

The lock spring 18 illustrated in FIG. 1A (or FIG. 2) may be composed of a coned disc spring and the like instead of the coil spring presented as an example.

The returning means of the pressing members 56 may be other types of elastic members such as rubbers and the like instead of the rod-shaped springs 58 presented as an example.

It is sufficient that the annular plug 9 is fixed to the housing 6. Therefore, the annular plug 9 may be fixed to the housing 6 by means of a tightening means such as a screw engagement or a flange connection instead of being formed integrally with the housing 6.

The ceiling wall 9*b* of the annular plug 9 may be omitted according to the use environment.

The support surface 1*a* may be provided on the base plate 5 instead of the upper surface of the flange 6*a* of the housing 6. The base plate 5 and the housing 6 may be formed integrally instead of separately.

In a case that the fixing force of the pressing members 56 in the locked state is set to a sufficiently large value, the clamp means (not shown) can be omitted.

FIG. 4A and FIG. 4B, FIG. 5 and FIG. 6, and FIG. 11 show a second embodiment, a third embodiment, and a fourth embodiment, respectively. In these embodiments, components similar to those of the first embodiment will be designated and described by the same numerals as a general rule.

Figure 4B:
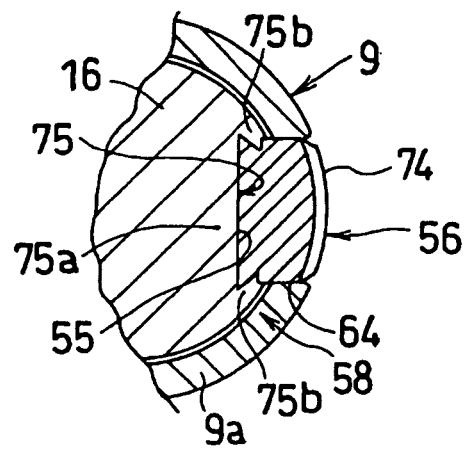
FIG. 4B is an enlarged sectional view indicated by the arrow 4B-4B in FIG. 4A.
Figure 4A:
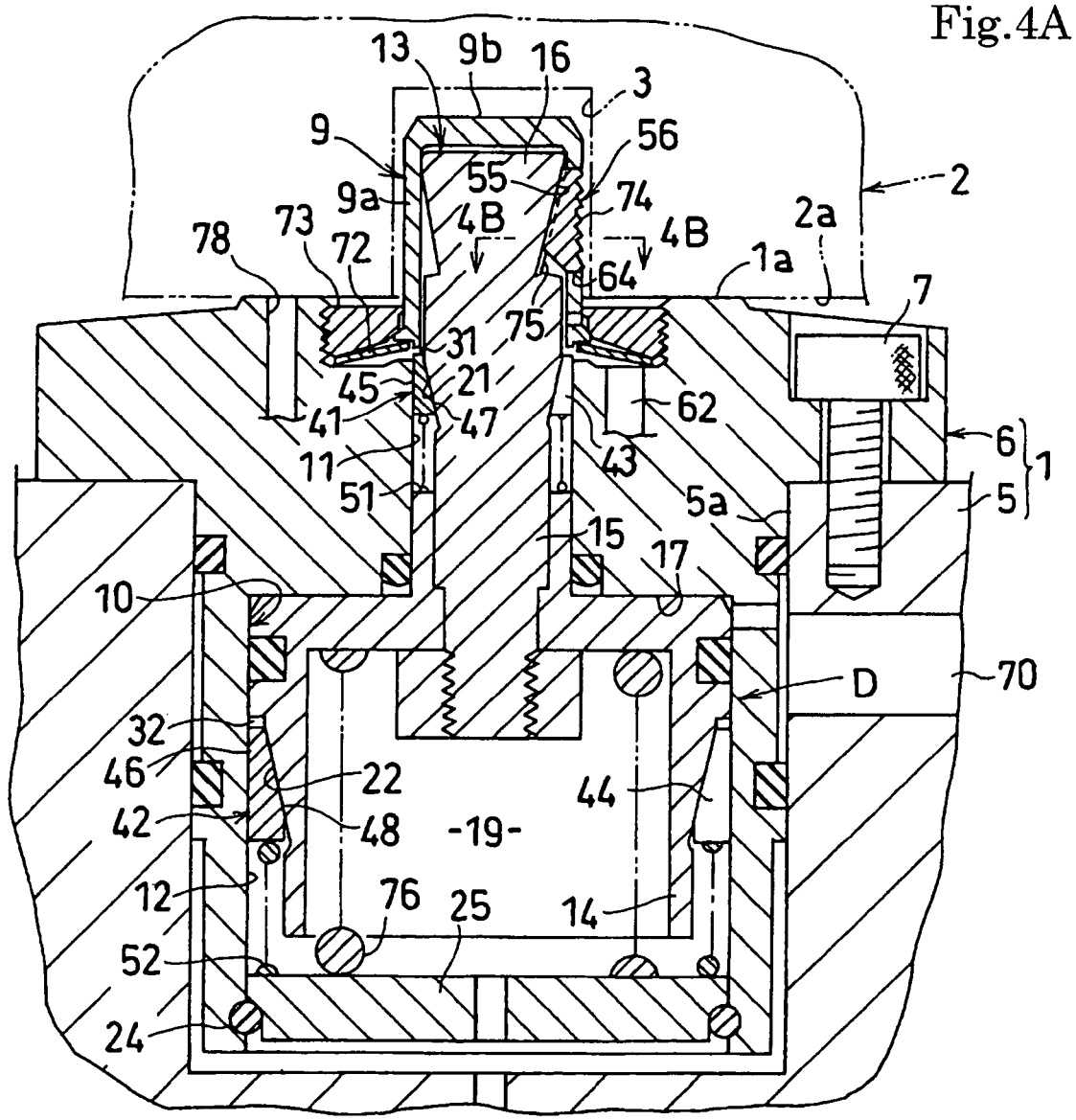
FIG. 4A is a view similar to FIG. 1A, showing a second embodiment according to the present invention.

FIG. 4A and FIG. 4B show the second embodiment of the present invention. FIG. 4A is a view similar to FIG. 1A showing the first embodiment. FIG. 4B is an enlarged sectional view indicated by the arrow 4B-4B in FIG. 4A;

This second embodiment is different from the first embodiment in the following points.

The cap-shaped annular plug 9 having the ceiling wall 9*b* is supported on an upper portion of the housing 6 vertically movably. The annular plug 9 is pressed upward by a coned disc spring (an advancing means) 72, and prevented from moving upward by more than a predetermined range by means of an annular bolt 73.

The pressing members 56 are supported on the peripheral wall 9*a* of the annular plug 9 radially movably, and on an outer periphery of the pressing members 56 is formed saw-toothed pressing portion 74, which engages with the positioning hole 3.

The output portion 16 is provided with three inclined grooves 75 circumferentially at intervals (here, only one inclined groove 75 is illustrated). On a bottom wall 75*a* of each of the inclined grooves 75 is formed the wedge surface 55 in such a manner that the wedge surface 55 gets closer to the axis downwards.

The returning means 58 is formed by the side wall 75*b* of the inclined grooves 75. Herein, the inclined groove 75 is formed substantially into a V shape in a plan view, the pressing member 56 is fitted into the V-shaped inclined groove 75 vertically movably.

The lock chamber 17 is formed above the piston 14, and with the lock chamber 17 is adapted to communicate the supply and discharge port 70. In the release chamber 19 formed below the piston 14 is installed a release spring 76, the lower end of which is received by the end plate 25.

The lower portion of the first urging means 51 composed of a spring is received by an upwardly-projecting portion of the piston 14, while the lower portion of the second urging means 52 composed of a spring is received by the end plate 25.

The supply port 62 for the cleaning compressed air is adapted to communicate with the discharge port 64, also with the fitting gap between the inner peripheral surface of the annular bolt 73 and a lower part of the outer peripheral surface of the annular plug 9.

The positioning apparatus of the second embodiment operates as follows.

When the releasing state illustrated in FIG. 4A is switched into a locking state, pressurized oil is supplied to the lock chamber 17. Then, first, the output member 13 descends, by which the wedge surface 55 pushes the pressing member 56 radially outward, and the pressing portion 74 of the pressing member 56 engages with the positioning hole 3 in a bitten state. At the same time as this positioning, the annular plug 9 descends against the coned disc spring 72, by which the pressing member 56, which is in a bitten state, strongly presses the work pallet 2 against the reference block 1. Therefore, the clamp means (not shown) described in the explanation of the first embodiment may be omitted.

It is noted that the positioning apparatus is provided with a seating confirmation means. That is, a detection nozzle hole 78 is opened in the support surface 1*a*, and compressed air for detecting is supplied to the detection nozzle hole 78. When the supported surface 2*a* is brought into contact with the support surface 1*a*, the pressure inside the detection nozzle hole 78 increases. The increase of the pressure is detected by a pressure switch and the like, by which it can be confirmed that the work pallet 2 is seated on the reference block 1.

The second embodiment can be changed as follows.

The number of pairs of the inclined groove 75 and pressing member 56 may be two, or more than four, instead of three presented as an example.

The advancing means, which pushes the annular plug 9 up at a predetermined force, may be another type of spring or an elastic member such as rubber or the like instead of the coned disc spring 72 presented as an example. Furthermore, hydraulic pressure and air pressure and the like are also available as the advancing means.

The ceiling wall 9*b* of the annular plug 9 may be omitted according to the use environment.

Figure 5:
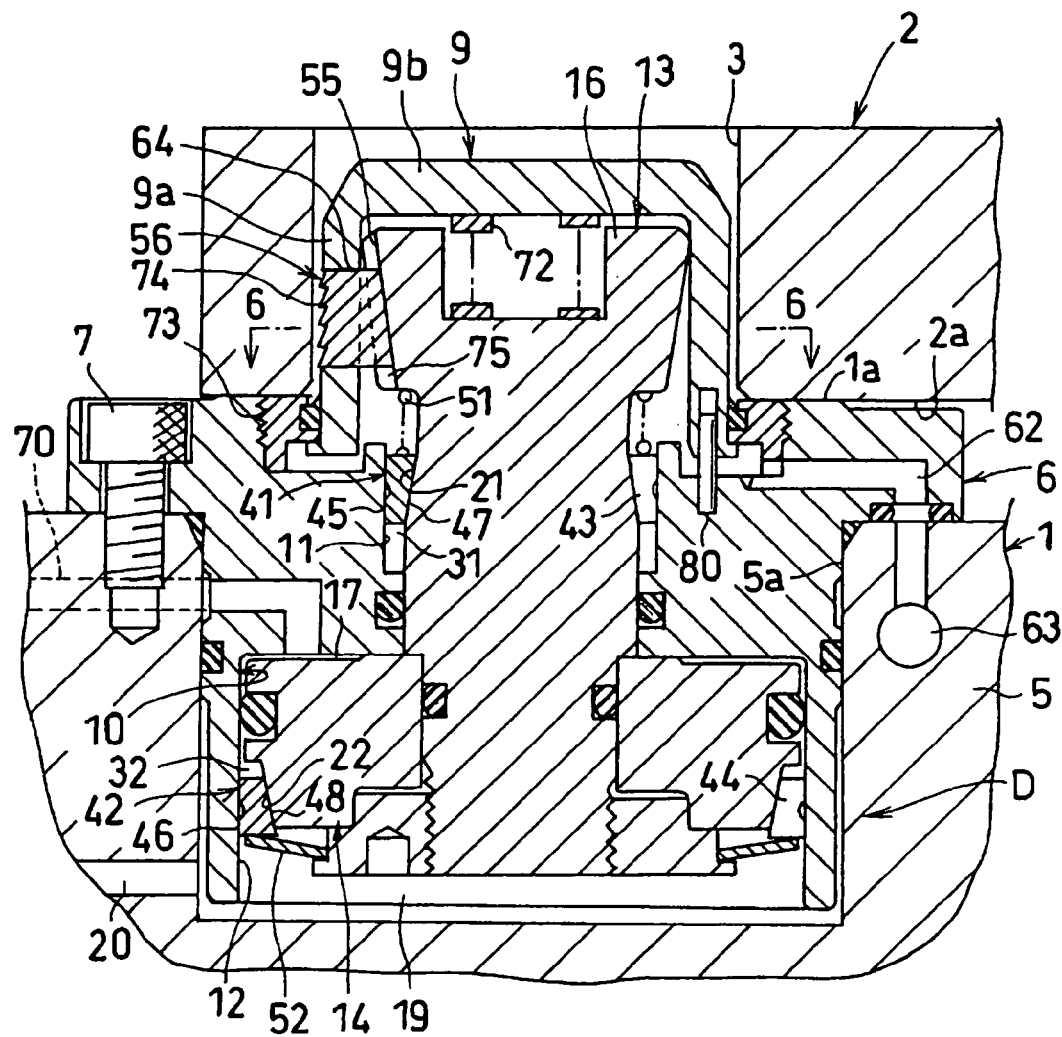
FIG. 5 is a view similar to FIG. 4A, showing a third embodiment according to the present invention.
Figure 6:
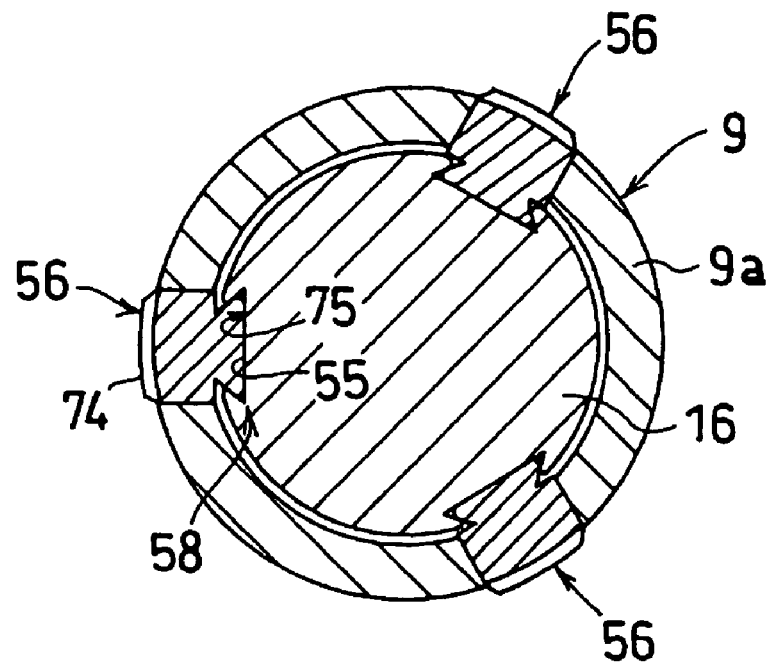
FIG. 6 is an end view indicated by the arrow 6-6 in FIG. 5, which is similar to FIG. 4B, showing an arrangement of a plurality of pressing members.

FIG. 5 and FIG. 6 show a third embodiment of the present invention. FIG. 5 is a view similar to FIG. 4A. FIG. 6 is an end view indicated by the arrow 6-6 in FIG. 5, which is similar to FIG. 4B.

This third embodiment is different from the second embodiment (illustrated in FIG. 4A and FIG. 4B) in the following points.

The movable block 2 is composed of a work piece, and the positioning hole 3 is formed with a through hole.

The annular plug 9 is supported on the housing 6 via the annular bolt 73 vertically movably, and fixed by a guide pin 80 so as not to rotate. The advancing means 72, which presses the annular plug 9 upward, is composed of a compressed coil spring, which is installed between the ceiling wall 9*b* of the annular plug 9 and the output portion 16.

The first aligning space 31 is formed in such a manner as to narrow downward, the straight surface 45 on the outer periphery of the first shuttle member 41 is supported on the first guide hole 11 vertically slidably, and the tapered surface 47 on the inner periphery of the first shuttle member 41 is adapted to make a tapering engagement with the first guided portion 21. According to this arrangement, the sliding resistance, which occurs during locking operation (descending) of the output member 13 between the straight surface 45 of the first shuttle member 41 and the first guide hall 11, decreases.

Also, the release chamber 19 formed below the piston 14 is adapted to communicate with the supply and discharge port 20, and the lock chamber 17 formed above the piston 14 is adapted to communicate with the supply and discharge port 70. Consequently, the driving means D is composed of a hydraulic double-acting type.

As illustrated in FIG. 6, three of the V-shaped inclined grooves 75 are formed in the output portion 16 circumferentially at regular intervals, into each of the inclined grooves 75 is fitted the pressing member 56.

Figure 7:
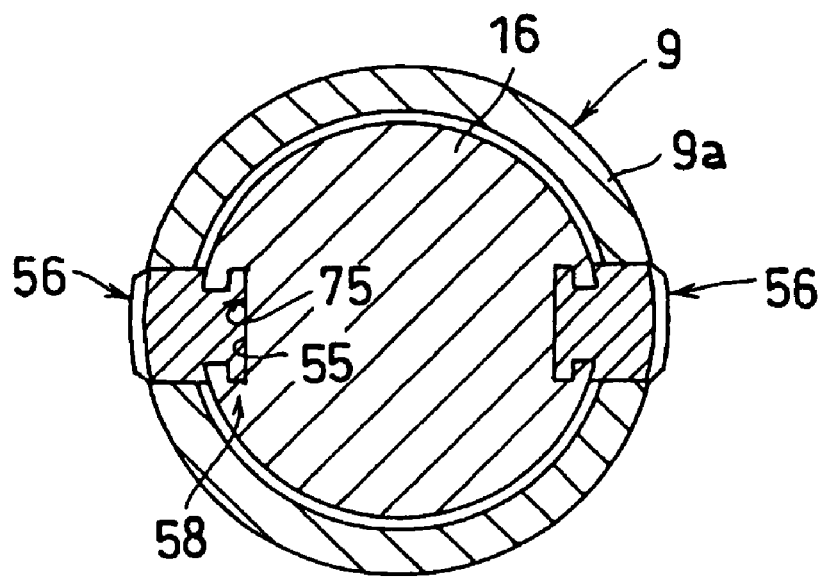
FIG. 7 is a view similar to FIG. 6, showing an exemplary variation of the arrangement of a plurality of the pressing members.

FIG. 7 is a view similar to FIG. 6, showing an exemplary variation of the arrangement of a plurality of the pressing members. In this case, two T-shaped inclined grooves 75 are provided in the output portion 16 to face each other, into each of the inclined grooves 75 is fitted the pressing member 56.

Employed with both of the positioning apparatuses which have the structures illustrated in FIG. 6 and FIG. 7, the positioning of the work pallet 2 (refer to FIG. 1A) can be performed smoothly and accurately.

Besides, It is matter of course that the structures illustrated in FIG. 6 or FIG. 7 can be applied to the first embodiment illustrated in FIG. 1A and FIG. 1B.

Figure 8:
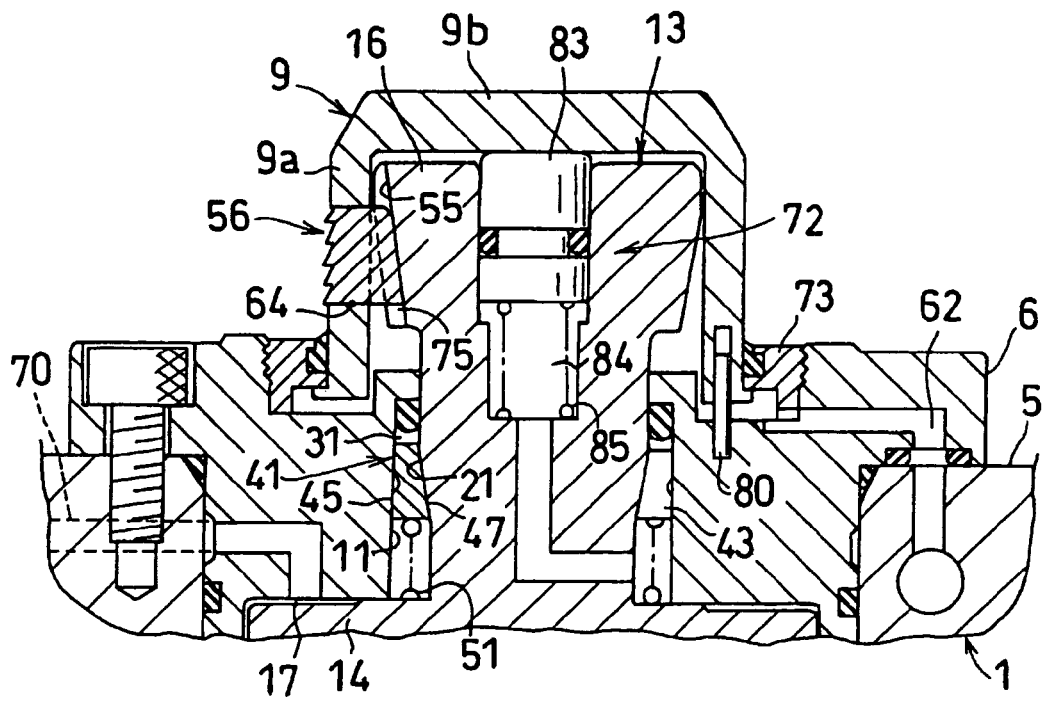
FIG. 8 is a partial view similar to FIG. 5, showing a first exemplary variation of the third embodiment.

FIG. 8 is a partial view similar to FIG. 5, showing a first exemplary variation of the third embodiment. This first exemplary variation is different from the structure illustrated in FIG. 5 in the following points.

A press piston 83 is hermetically inserted into the output portion 16, and a press chamber 84 provided below the press piston 83 is adapted to communicate with the hydraulic lock chamber 17. The advancing means 72, which pushes the annular plug 9 up, is composed of the press piston 83, the press chamber 84, and a push-up spring 85.

Figure 9:
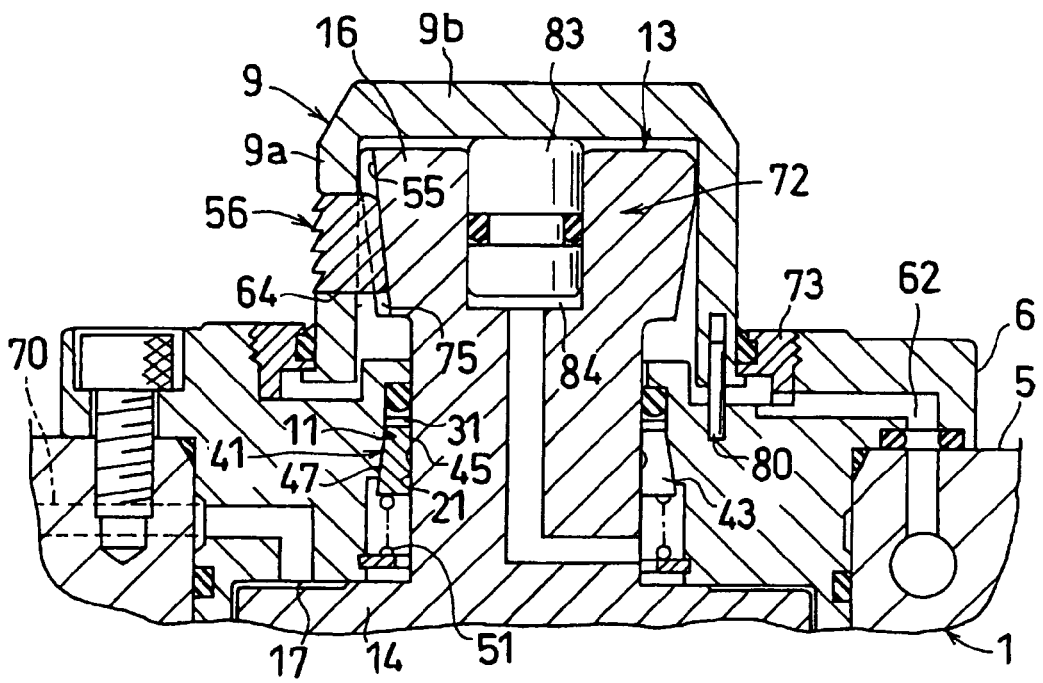
FIG. 9 is a view similar to FIG. 8, showing a second exemplary variation of the third embodiment.

FIG. 9 is a view similar to FIG. 8, showing a second exemplary variation of the third embodiment. This second exemplary variation is different from the structure illustrated in FIG. 8 in the following points.

The push-up spring 85 in FIG. 8 is omitted, and the advancing means 72 is composed of the press piston 83 and the press chamber 84.

The first aligning space 31 is formed in such a manner as to narrow upward, the tapered surface 47 on the outer periphery of the first shuttle member 41 is adapted to make a tapering engagement with the first guide hole 11, and the straight surface 45 on the inner periphery of the first shuttle member 41 is supported on the first guided portion 21 vertically slidably. According to this arrangement, the sliding resistance, which occurs during locking operation (descending) of the output member 13 between the straight surface 45 of the first shuttle member 41 and the first guided portion 21, decreases.

Figure 10:
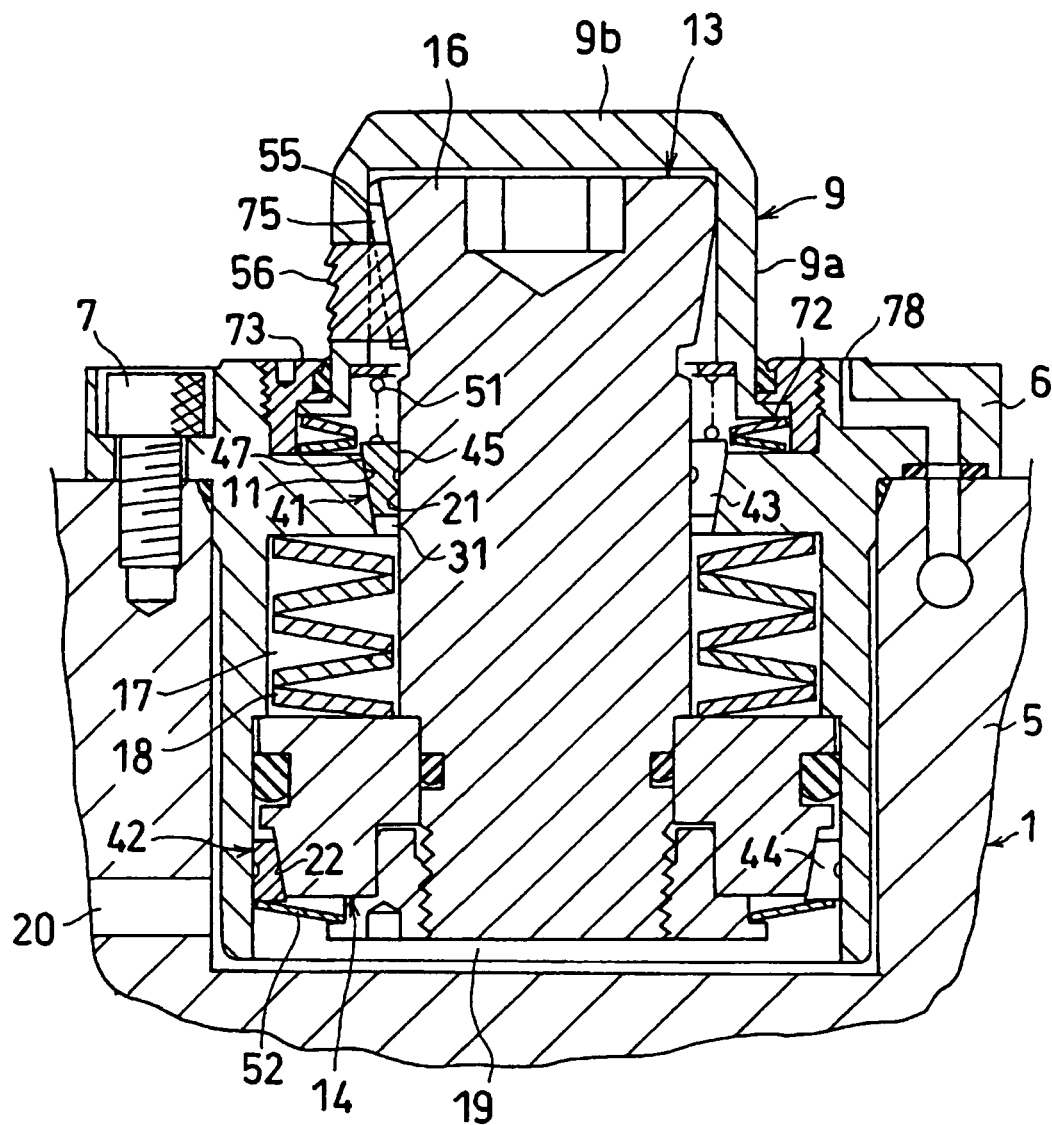
FIG. 10 is a view similar to FIG. 5, showing a third exemplary variation of the third embodiment.

FIG. 10 is a view similar to FIG. 5, showing a third exemplary variation of the third embodiment. This third exemplary variation is different from the structure illustrated in FIG. 5 in the following points.

The advancing means 72, which pushes the annular plug 9 up, is composed of a plurality of coned disc springs.

The first aligning space 31 is formed in such a manner as to narrow downward, and the tapered surface 47 on the outer periphery of the first shuttle member 41 is adapted to make a tapering engagement with the first guide hole 11, and the straight surface 45 on the inner periphery of the first shuttle member 41 is supported on the first guided portion 21 vertically slidably.

Furthermore, to the lock chamber 17 formed above the piston 14 is installed a lock spring 18 composed of a large plurality of coned disc springs.

Figure 11:
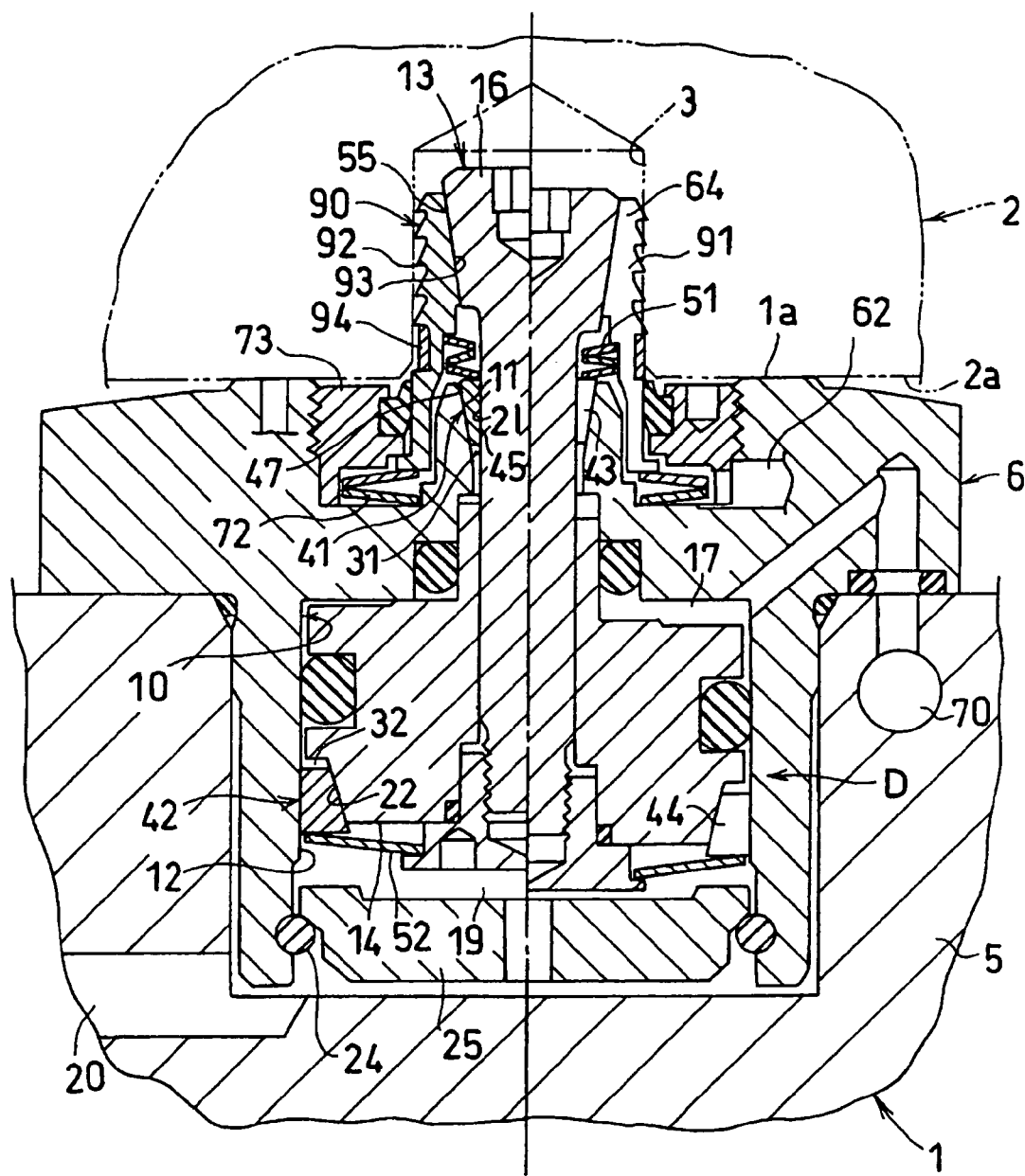
FIG. 11 is a view similar to FIG. 4A, showing a fourth embodiment according to the present invention, the left half showing a released state while the right half a locked state.

FIG. 11 is a view similar to FIG. 4A, showing a fourth embodiment according to the present invention, the left half showing a released state while the right half a locked state.

This fourth embodiment illustrated in FIG. 11 is different from the structure of FIG. 4A and FIG. 1A in the following points.

An annular collet 90 is supported on the upper portion of the housing 6 vertically movably, and the annular collet 90 is pressed upward by two coned disc springs (advancing means) 72, and prevented from moving upward by more than a predetermined range by means of an annular bolt 73.

The annular collet 90 is integrally formed with one slit 91, and adapted to be contractible by its own restoring force. On the outer peripheral surface of the annular collet 90 are provided saw-toothed pressing portions 92, which engage with the positioning hole 3. In addition, with the tapered pressure-receiving surface 93 formed on the inner periphery of the annular collet 90 is engaged the tapered wedge surface 55 of the output portion 16 from above. The tapered pressure-receiving surface 93 and the tapered wedge surface 55 are formed in such a manner as to narrow downward.

Besides, It is preferable that the annular collet 90 is diametrically contractible by a ring-shaped leaf spring (returning means) 94, however, the leaf spring 94 may be omitted.

The first aligning space 31 is formed in such a manner as to narrow downward. Then, the tapered surface 47 on the outer periphery of the first shuttle member 41 is adapted to make a tapering engagement with the first guide hole 11, and the straight surface 45 on the inner periphery of the first shuttle member 41 is supported on the first guided portion 21 vertically slidably. The first shuttle member 41 is pressed downward by the first urging means 51 formed with a coned disc spring.

The release chamber 19, which is formed below the piston 14, is adapted to communicate with the supply and discharge port 20, while the lock chamber 17, which is formed above the piston 14, is adapted to communicate with the supply and discharge port 70. Consequently, the driving means D is composed of a hydraulic double-acting type.

This apparatus of the fourth embodiment operates in almost the same manner as operation of the second embodiment (FIG. 4A and FIG. 4B). That is, during locking operation, the pressing portions 92 of the annular collet 90 engages with the positioning hole 3 in a bitten state, by which the annular collet 90, which is in a bitten state, presses the work pallet 2 against the support surface 1a of the reference block 1.

Figure 12:
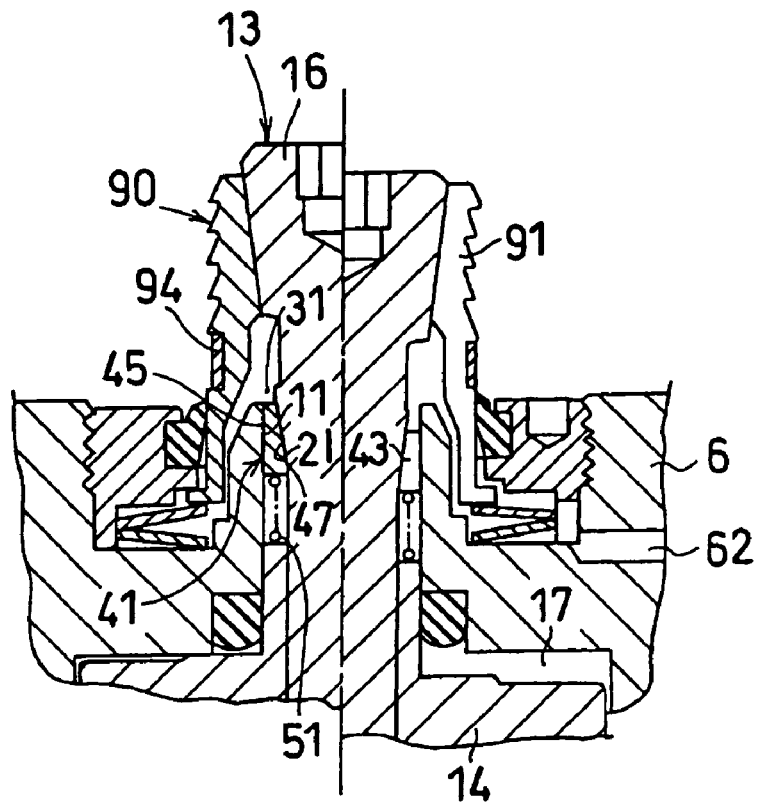
FIG. 12 is a partial view similar to FIG. 11, showing a first exemplary variation of the fourth embodiment.

FIG. 12 is a partial view similar to FIG. 11, showing a first exemplary variation of the fourth embodiment. This first exemplary variation is different from the structure illustrated in FIG. 11 in the following points.

The first aligning space 31 is formed in such a manner as to narrow upward, the straight surface 45 on the outer periphery of the first shuttle member 41 is supported on the first guide hole 11 vertically slidably, and the tapered surface 47 on the inner periphery of the first shuttle member 41 makes a tapering engagement with the first guided portion 21.

Figure 13:
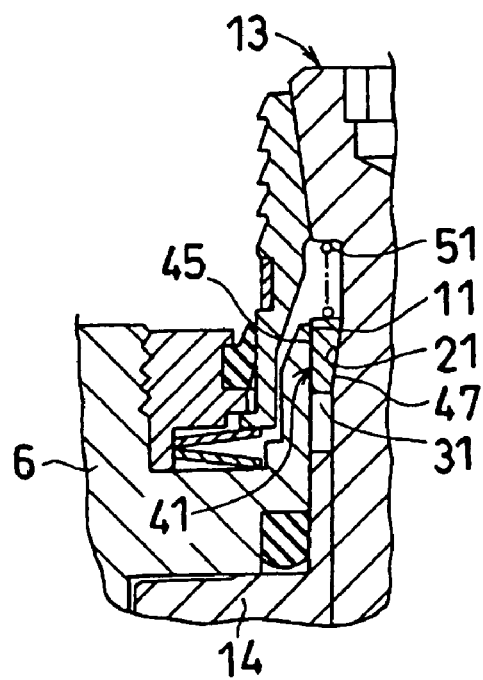
FIG. 13 is a view similar to the left half of FIG. 12, showing a second exemplary variation of the fourth embodiment.

FIG. 13 is a view similar to the left half of FIG. 12, showing a second exemplary variation of the fourth embodiment.

In this case, the first aligning space 31 is formed in such a manner as to narrow downward, the straight surface 45 on the outer periphery of the first shuttle member 41 is supported on the first guide hole 11 vertically slidably, and the tapered surface 47 on the inner periphery of the first shuttle member 41 makes a tapering engagement with the first guided portion 21. According to this arrangement, the sliding resistance, which occurs during locking operation (descending) of the output member 13 between the straight surface 45 of the first shuttle member 41 and the first guide hole 11, decreases.

Figure 14D:
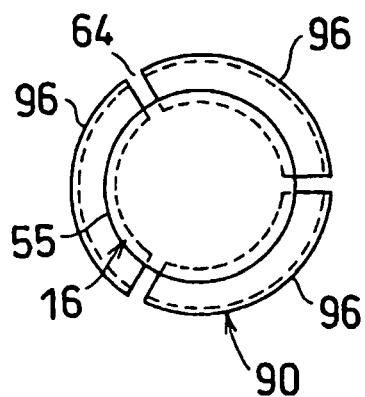
FIG. 14D is a view similar to FIG. 14C, showing another annular collet.
Figure 14C:
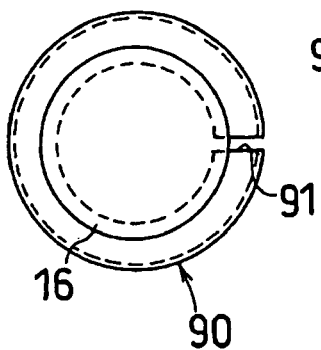
FIG. 14C is a view showing an annular collet, corresponding a plan view of an upper end portion of FIG. 14A.
Figure 14E:
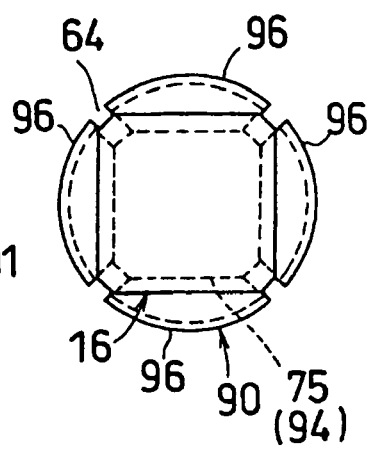
FIG. 14E is a view similar to FIG. 14C, showing still another annular collet.
Figures 14A, 14B:
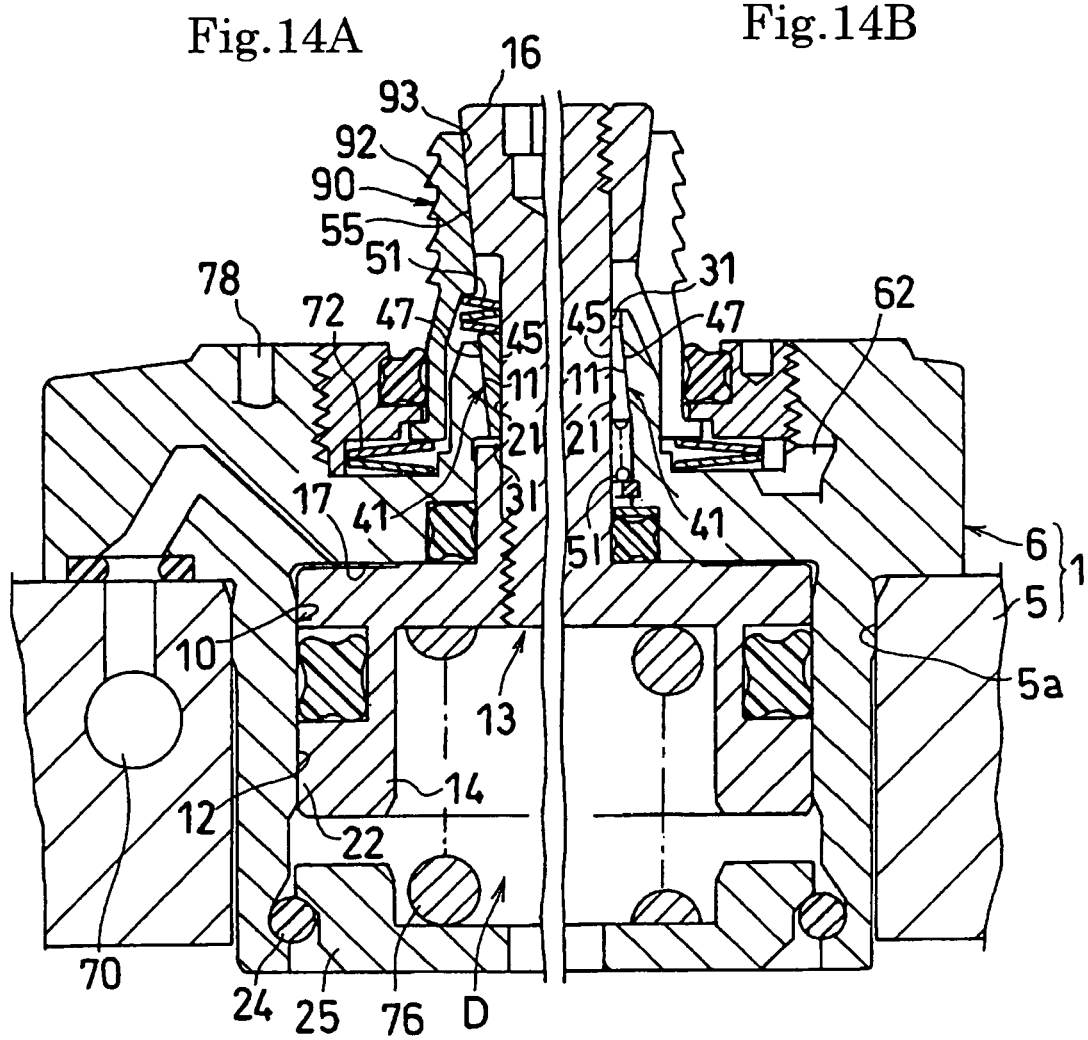
FIG. 14A is a view similar to the left half of FIG. 11 showing the released state, showing a third exemplary variation of the fourth embodiment.
FIG. 14B is a view similar to FIG. 14A, showing a fourth exemplary variation of the fourth embodiment.

FIG. 14A is a view similar to the left half of FIG. 11 showing the released state, showing a third exemplary variation of the fourth embodiment.

In this third exemplary variation, the second aligning space 32, the second shuttle member 42, and the second urging means 52, which are illustrated in the left half of FIG. 11, are omitted, and the second guided portion 22 of the piston 14 is directly fitted into the second guide hole 12.

FIG. 14B is a view similar to FIG. 14A, showing a fourth exemplary variation of the fourth embodiment. This fourth exemplary variation is different from the structure illustrated in FIG. 14A in the following points.

The first aligning space 31 is formed in such a manner as to narrow upward, the tapered surface 47 on the outer periphery of the first shuttle member 41 is adapted to make a tapering engagement with the first guide hole 11, and the straight surface 45 on the inner periphery of the first shuttle member 41 is supported on the first guided portion 21 vertically slidably. According to this arrangement, the sliding resistance, which occurs during locking operation (descending) of the output member 13 between the straight surface 45 of the first shuttle member 41 and the first guided portion 21, decreases.

FIG. 14C is a view showing the annular collet 90, corresponding a plan view of an upper end portion of FIG. 14A (and FIG. 14B). This annular collet 90 is integrally formed with one slit 91. The annular collet 90 may be provided with a plurality of through grooves opened in the annular wall thereof in such a manner that the grooves are opened alternately in an upper end and a lower end instead of the slit 91.

FIG. 14D is a view similar to FIG. 14C, showing another annular collet 90.

This annular collet 90 illustrated in FIG. 14D is composed of three divided members 96 arranged circumferentially. These divided members 96 are adapted to be diametrically contractible by returning means (not shown) formed with the ring-shaped leaf springs and the like. On the output portion 16 is formed the tapered wedge surface 55. With a gap between the adjacent divided members 96 is formed the discharge port 64 for the cleaning compressed air.

FIG. 14E is a view similar to FIG. 14C, showing still another annular collet 90.

In this case, the annular collet 90 is composed of four divided members 96 arranged circumferentially. The output portion 16 is formed into a quadrangular pyramid shape. On the output portion 16 are formed four of the inclined grooves 75, which are almost similar to those of FIG. 4A and FIG. 4B, and the divided members 96 are fitted into the peripheral wall of the inclined grooves 75. By means of the returning means 94 having the fitting structure, a plurality of divided members 96 is adapted to be diametrically expandable and contractible. And with the gap between the adjacent divided members 96 is formed the discharge port 64 for the cleaning compressed air.

The first embodiment through the fourth embodiment and the respective exemplary variations can be further changed as follows.

The aligning drive mechanism may include three or more annular aligning spaces instead of one or two presented as an example.

It is sufficient that the shuttle members 41 and 42, which are inserted into the aligning spaces, are diametrically expandable and contractible and adapted to be in close contact with the guide hole 10 or the output member 13. That is, it is a matter of course that the shapes and structures thereof are not limited to those presented as an example.

The urging means 51 and 52 of the shuttle members 41 and 42 may include elastic members such as rubber, and may take advantage of pressurized fluid such as pressurized oil or compressed air or the like instead of the springs presented as an example.

The output portion 16 may be provided at the lower end of the output member 13 instead of the upper end thereof. Furthermore, the output portion 16 may be provided at a middle high portion of the output member 13 and/or between a plurality of the guided portions 21 and 22.

As a locking operation, the output member 13 can be moved with load upward (toward the leading end) instead of being moved with load downward (toward the base end) presented as an example. In this case, it is sufficient that the wedge surface 55 is formed in such a manner as to narrow upward.

The pressurized fluid to be used for the locking and releasing operation of the driving means D may be gases such as compressed air instead of the pressurized oil presented as an example.

The cleaning pressurized fluid may be other kind of gases such as nitrogen and the like, and liquid instead of the compressed air presented as an example.

The combination of the reference block and the movable block may be the combination of a table of a machine tool and a work pallet, the combination of a work pallet and a jig base, the combination of a jig base and a work piece, or the combination of a working jig such as a welding jig and a working article such as a work piece instead of the combination of the base plate 5 and the work pallet 2 presented as an example. The present invention can also be applied to the positioning of work piece, tools and the like of various kinds of processing machines such as laser processing machines and electric discharge processing machines.

The aligning drive mechanism of the present invention is preferably used for the positioning apparatus presented as an example, however, the use is not limited thereto, for example, the present invention is also applicable to other uses such as clamping apparatuses or pushing and pulling apparatuses.

What is claimed is:

1. An aligning drive mechanism, comprising:
    a guide hole (10) as a reference surface for aligning is formed in a housing (6),
    an output member (13) is inserted into the guide hole (10) axially movably,
    the output member (13) is provided with a plurality of guided portions (21, 22) axially at intervals,
    an annular aligning space (31, 32), which narrows in either one axial direction, is formed between at least one of the guided portions (21, 22) and the guide hole (10),
    a shuttle member (41, 42), which is diametrically expandable and contractible, is inserted into the aligning space (31, 32), the shuttle member (41, 42) is supported on either one of the guide hole (10) or the guided portion (21, 22) axially movably, and configured to make a tapering engagement with the other of the guided portion or the guide hole (21, 22 or 10),
    the shuttle member (41, 42) is urged by an urging means (51, 52) in such a direction as to tighten the tapering engagement,
    the output member (13) is configured to be axially reciprocatable by
    a driving means (D).

2. The aligning drive mechanism as set forth in claim 1, wherein
    the guide hole (10) is composed of a first guide hole (11) and a second guide hole (12), the diameter of which is larger than that of the first guide hole (11),
    a plurality of the guided portions are composed of a first guided portion (21) corresponding to the first guide hole (11) and a second guided portion (22) corresponding to the second guide hole (12),
    the annular aligning space (31) is formed between the first guide hole (11) and the first guided portion (21), the shuffle member (41) is inserted into the aligning space (31).

3. The aligning drive mechanism as set forth in claim 2, wherein the annular aligning space (32) is formed between the second guide hole (12) and the second guided portion (22), and the shuttle member (42) is inserted into the aligning space (32).

4. The aligning drive mechanism as set forth in claim 1, wherein
    a straight surface (45, 46) of the shuttle member (41, 42) is movably supported on the guide hole (10), and a tapered surface (47, 48) of the shuttle member (41, 42) is configured to make a tapering engagement with the guided portion (21, 22).

5. The aligning drive mechanism as set forth in claim 1, wherein
    a straight surface (45, 46) of the shuttle member (41, 42) is movably supported on the guided portion (21, 22), and a tapered surface (47, 48) of the shuttle member (41, 42) is configured to make a tapering engagement with the guide hole (10).

6. The aligning drive mechanism as set forth in claim 1, wherein
    the output member (13) is configured to be movable with load toward a base end, the annular aligning space (31, 32) is formed in such a manner as the tapering engagement to be tightened during the movement with load toward the base end.

7. The aligning drive mechanism as set forth in claim 1, wherein the output member (13) is configured to be movable with load toward a base end, the annular aligning space (31, 32) is formed in such a manner as the tapering engagement to be loosened during the movement with load toward the base end.

8. The aligning drive mechanism as set forth in claim 1, wherein the output member (13) is configured to be movable with load toward a leading end, the annular aligning space (31, 32) is formed in such a manner as the tapering engagement to be tightened during the movement with load toward the leading end.

9. The aligning drive mechanism as set forth in claim 1, wherein the output member (13) is configured to be movable with load toward a leading end, the annular aligning space (31, 32) is formed in such a manner as the tapering engagement to be loosened during the movement with load toward the leading end.

10. A positioning apparatus having the aligning drive mechanism set forth in claim 6 or 7, and further comprising:

a reference block (1) as a fixed side is provided with the housing (6), an annular plug (9), which is to be inserted into a positioning hole (3) of a movable block (2), is projected from the housing (6) toward a leading end, an output portion (16) of the output member (13) is inserted into the annular plug (9), a wedge surface (55) is provided on a periphery of the output portion (16) in such a manner that the wedge surface (55) gets closer to the axis toward the base end, a plurality of pressing members (56) are supported on a peripheral wall (9*a*) of the annular plug (9) circumferentially at intervals and radially movably, the wedge surface (55) is configured to make a wedge engagement with the pressing members (56), the pressing members (56) are configured to be restorable radially inward by a returning means (58).

11. The positioning apparatus as set forth in claim 10, wherein the annular plug (9) having a ceiling wall (9*b*) is fixed to the housing (6).

12. The positioning apparatus as set forth in claim 11, wherein a supply port (62) for a cleaning fluid is provided in the housing (6), a discharge port (64) for the cleaning fluid is formed with a fitting gap between the peripheral wall (9*a*) of the annular plug (9) and the pressing member (56), and the discharge port (64) is configured to communicate with the supply port (62).

13. The positioning apparatus as set forth in claim 10, wherein the annular plug (9) having a ceiling wall (9*b*) is supported on the housing (6) axially movably within a predetermined range, and the annular plug (9) is pressed toward the leading end by an advancing means (72).

14. The positioning apparatus as set forth in claim 13, wherein a supply port (62) for a cleaning fluid is provided in the housing (6), a discharge port (64) for the cleaning fluid is formed with a fitting gap between the peripheral wall (9*a*) of the annular plug (9) and the pressing member (56), and the discharge port (64) is configured to communicate with the supply port (62).

15. The positioning apparatus as set forth in claim 10, wherein the wedge surface (55) is formed with a tapered outer peripheral surface.

16. The positioning apparatus as set forth in claim 10, wherein a plurality of the wedge surfaces (55) are arranged circumferentially at intervals.

17. The positioning apparatus as set forth in claim 16, wherein a plurality of inclined grooves (75) are provided on the output portion (16) of the output member (13) circumferentially at intervals, and the wedge surface (55) is formed on a bottom wall (75*a*) of the inclined groove (75).

18. The positioning apparatus as set forth in claim 17, wherein the returning means (58) is formed with a fitting structure between a peripheral wall of the inclined groove (75) and the pressing member (56).

19. A positioning apparatus having the aligning drive mechanism set forth in claim 6 or 7, and further comprising:

a reference block (1) as a fixed side is provided with the housing (6), an annular collet (90), which is to be inserted into a positioning hole (3) of a movable block (2), is supported on the housing (6) axially movably within a predetermined range, the annular collet (90) is pressed toward a leading end by an advancing means (72), an output portion (16) of the output member (13) is inserted into the annular collet (90), a wedge surface (55) is provided on a periphery of the output portion (16) in such a manner that the wedge surface (55) gets closer to the axis toward the base end, a pressing portion (92), which engages with the positioning hole (3), is provided on a peripheral surface of the annular collet (90).

20. The positioning apparatus as set forth in claim 19, wherein the annular collet (90) is integrally formed with at least one slit (91), and configured to be contractible by either one of an inherent elastic restoring force or a returning means (94).

21. The positioning apparatus as set forth in claim 19, wherein the annular collet (90) is composed of a plurality of divided members (96) arranged circumferentially, and configured to be contractible by a returning means (94).

22. The positioning apparatus as set forth in claim 19, wherein a supply port (62) for a cleaning fluid is provided in the housing (6), a discharge port (64) for the cleaning fluid is formed in the peripheral wall of the annular collet (90), and the discharge port (64) is configured to communicate with the supply port (62).

* * * * *